United States Patent [19]
Chavez, Jr. et al.

[11] Patent Number: 5,907,807
[45] Date of Patent: May 25, 1999

[54] DYNAMIC LEARNING OF NEIGHBORING WIRELESS CELLS

[75] Inventors: David L. Chavez, Jr., Thornton; Ted M. Fidder, Broomfield; Larry J. Hardouin, Westminster; Kenneth J. Roberge, Boulder, all of Colo.

[73] Assignee: Lucent Technologies Inc., Murray Hill, N.J.

[21] Appl. No.: 08/769,195

[22] Filed: Dec. 18, 1996

[51] Int. Cl.$^6$ .................................................. H04B 7/26
[52] U.S. Cl. ......................... 455/436; 455/435; 455/453
[58] Field of Search .................................... 455/422, 423, 455/436, 437, 439, 445, 450, 452, 453, 455, 435

[56] References Cited

U.S. PATENT DOCUMENTS

| | | | |
|---|---|---|---|
| 4,670,899 | 6/1987 | Brody et al. | 455/436 |
| 5,379,448 | 1/1995 | Ames et al. | 455/453 |
| 5,666,356 | 9/1997 | Flemming et al. | 455/453 |

FOREIGN PATENT DOCUMENTS

| | | | |
|---|---|---|---|
| 0701382 | 3/1996 | European Pat. Off. | H04Q 9/00 |

Primary Examiner—Thanh Cong Le
Attorney, Agent, or Firm—John C. Moran

[57] ABSTRACT

Using dynamic learning techniques by a system controller to determine a subset of neighboring cell sites to which an activity transfer should be attempted. An activity transfer can be a handoff or registration. The neighboring cell sites that should be chosen for an activity transfer are specified for each cell site. The specified neighboring cell sites are determined by the dynamic learning process. In a first embodiment, the dynamic learning is accomplished by accumulating statistical data that defines the average call duration of each of the selected neighboring sites after an activity transfer to each. Advantageously, this average duration can include the total call duration for two subsequent activity transfers. In a second embodiment, the dynamic learning is accomplished by accumulating statistical data that defines the maximum transmission power from the base station to which a handset was transferred. In a third embodiment, the duration of the low power transmission level of the base station from which the handset had just been transferred is timed. If the duration is less than a predefined number, it is assumed that a null had occurred, and that fact is stored for that cell. This information is used to detect multipath fading and to prevent premature handoffs when multipath fading occurs. Subsequently, a transfer is delayed for a cell having a large average number of nulls.

28 Claims, 21 Drawing Sheets

| CURRENT BASE STATION NUMBER | TARGET BASE STATION NUMBER | NUMBER OF HANDOFFS | AVERAGE DURATION OF HANDOFFS |
|---|---|---|---|
| 101 | 102 | 10 | 2 |
| 101 | 103 | 12 | 1.8 |
| 101 | 104 | 11 | 1.2 |
| 101 | 106 | 3 | .2 |
| 101 | 107 | 4 | .5 |
| 101 | 109 | 2 | .1 |
| 102 | 101 | 4 | .1 |
| 102 | 103 | 6 | .2 |
| 102 | 112 | 10 | 1.5 |
| 112 | 102 | 6 | .2 |
| 112 | 111 | 10 | 1.5 |
|  |  |  |  |

TABLE 1

FIG. 4

| CURRENT BASE STATION NUMBER | FIRST LAST BASE STATION NUMBER | FIRST LAST BASE STATION DURATION | SECOND LAST BASE STATION NUMBER | SECOND LAST BASE STATION DURATION |
|---|---|---|---|---|
| 102 | 101 | 1 | ----- | ----- |
|  |  |  |  |  |
|  |  |  |  |  |
|  |  |  |  |  |

501

TABLE 2

FIG. 5

| CURRENT BASE STATION NUMBER | FIRST LAST BASE STATION NUMBER | FIRST LAST BASE STATION DURATION | SECOND LAST BASE STATION NUMBER | SECOND LAST BASE STATION DURATION |
|---|---|---|---|---|
| 112 | 102 | 1.3 | 101 | 1 |
|  |  |  |  |  |
|  |  |  |  |  |
|  |  |  |  |  |
| 601 |  |  |  |  |

TABLE 2

FIG. 6

| CURRENT BASE STATION NUMBER | TARGET BASE STATION NUMBER | NUMBER OF HANDOFFS | AVERAGE DURATION OF HANDOFFS |
|---|---|---|---|
| 101 | 102 | 11 | 2.03 |
| 101 | 103 | 12 | 1.8 |
| 101 | 104 | 11 | 1.2 |
| 101 | 106 | 3 | .2 |
| 101 | 107 | 4 | .5 |
| 101 | 109 | 2 | .1 |
| 102 | 101 | 4 | .1 |
| 102 | 103 | 6 | .2 |
| 102 | 112 | 10 | 1.5 |
| 112 | 102 | 6 | .2 |
| 112 | 111 | 10 | 1.5 |
|  |  |  |  |

TABLE 1

FIG. 7

| CURRENT BASE STATION NUMBER | TARGET BASE STATION NUMBER | NUMBER OF HANDOFFS | AVERAGE DURATION OF HANDOFFS |
|---|---|---|---|
| 101 | 102 | 10 | 2 |
| 101 | 103 | 12 | 1.8 |
| 101 | 104 | 11 | 1.2 |
| 101 | 106 | 3 | .2 |
| 101 | 107 | 4 | .5 |
| 101 | 112 | 1 | 1.5 |
| 102 | 101 | 4 | .1 |
| 102 | 103 | 6 | .2 |
| 102 | 112 | 10 | 1.5 |
| 112 | 102 | 6 | .2 |
| 112 | 111 | 10 | 1.5 |
|  |  |  |  |

TABLE 1

FIG. 8

| CURRENT BASE STATION NUMBER | TARGET BASE STATION NUMBER | NUMBER OF HANDOFFS | AVERAGE MAXIMUM POWER |
|---|---|---|---|
| 1401 | 1402 | 5 | 300 |
| 1401 | 1403 | 8 | 250 |
| 1402 | 1403 | 10 | 100 |
| 1402 | 1401 | 18 | 500 |
| 1403 | 1401 | 8 | 250 |
| 1403 | 1402 | 10 | 100 |
|  |  |  |  |

TABLE 3

FIG. 16

| CURRENT BASE STATION NUMBER | TARGET BASE STATION NUMBER | NUMBER OF HANDOFFS | AVERAGE NUMBER OF NULLS DETECT PER HANDOFF |
|---|---|---|---|
| 1401 | 1402 | 5 | 0 |
| 1401 | 1403 | 8 | .4 |
| 1402 | 1403 | 10 | .1 |
| 1402 | 1401 | 18 | .8 |
| 1403 | 1401 | 8 | .2 |
| 1403 | 1402 | 10 | .6 |
|  |  |  |  |

TABLE 4

FIG. 19

DYNAMIC LEARNING OF NEIGHBORING WIRELESS CELLS

TECHNICAL FIELD

This invention relates to communication switching, and in particular, to an activity transfer of a wireless handset from one wireless base station to another.

BACKGROUND OF THE INVENTION

In prior art wireless communication systems, the implementation for performing an activity transfer such as a handoff was as follows. When the cell-site receiver handling a call from a wireless telephone noticed that the received signal strength from the wireless telephone fell below a predetermined threshold value, the cell site asked a system controller controlling the overall wireless system to determine if a neighboring cell site was receiving the wireless telephone's signal at an adequate signal strength. The system controller in response to the current cell site inquiry sent messages to the neighboring cell sites with a handoff request. Each neighboring cell site scanned for the signal from the wireless telephone on the channel specified by the system controller. When one of the neighboring cell sites reported an adequate signal level to the system controller, the system controller implemented the handoff. This method of determining neighboring cell-sites performs well for conventional cellular systems in which the number of cell sites is reasonably small, and each cell site covers a large geographical region. Because each cell site covers a large geographical region, the number of handoffs that occur is reasonably low.

Whereas this technique of performing handoff has worked well for large cellular telephone systems, in large personal communication systems (PCS), the technique has not been as effective in all situations. The reason is that within a large PCS system, there are potentially hundreds of cell sites each having an extremely small geographical area. In addition, PCS system uses high transmission frequencies and low transmission power resulting in frequent handoffs. Another problem in certain large PCS systems is that they are in office buildings where there are many obstructions, also the physical destination of the wireless handset's user plays a important role in the handoff process. For example, if the handset is moving down a particular hallway in a given direction, then the handoff should be to the next cell site that can handle that hallway in that direction. Note, because of the power and transmission frequencies or obstructions this desired cell site may not be the closest geographical cell site to the hallway. Because of the need to do frequent handoffs for each individual active wireless telephone and the extremely large number of cell sites, the system controller experiences a large real time processing load from performing handoffs. In addition, the PCS system is distinguished from a cellular telephone system in that a cellular telephone system may have each cell site surrounded by only three other cell sites; whereas, the PCS system normally will have each cell site having seven to 32 possible neighbors that may be candidates for a handoff. Further, because of the large number of cell sites in a PCS system, it is very difficult for a system administrator to hand specify for each cell site what are the possible candidate cell sites for handoffs let alone determine the best candidate cell sites based on user traffic patterns. In addition, PCS systems are characterized by constant addition and removal of cell sites.

It is clear that a problem exists with the present method for doing handoffs in large PCS systems since requiring each of the neighboring cell sites to monitor the wireless handset and report back to the system controller places a large real time processing burden on the system controller.

SUMMARY OF THE INVENTION

The foregoing problem is solved, and a technical advance is achieved by an apparatus and method in which a system controller uses dynamic learning techniques to determine a subset of neighboring cell sites to which an activity transfer should be attempted. Advantageously, an activity transfer can be a handoff or registration. This dynamic learning for each cell site can be done for all users or may be customized for each individual user. Advantageously, the neighboring cell sites that should be chosen for an activity transfer are specified for each cell site. The specified neighboring cell sites are determined by the dynamic learning process. In a first embodiment, the dynamic learning is accomplished by accumulating statistical data that defines the average call duration of each of the selected neighboring sites after an activity transfer to each. Advantageously, this average duration can include the total call duration for two subsequent activity transfers. In addition to choosing from the subset of known neighboring cell sites, the system controller randomly chooses a small subset of the remaining cell sites in the system as potential activity transfer target cell sites in order to learn new neighboring cell sites.

In a second embodiment, the dynamic learning is accomplished by accumulating statistical data that defines the maximum transmission power from the base station to which a handset was transferred. An average maximum power number is maintained for each cell for each of the cells to which that cell has done an activity transfer. When an activity transfer must be done, the target having the highest average maximum power number is selected.

In a third embodiment, the duration of the low power transmission level of the base station from which the handset had just been transferred is timed. If the duration is less than a predefined number, it is assumed that a null had occurred, and that fact is stored for that cell. This information is used to detect multipath fading and to prevent premature handoffs when multipath fading occurs. Subsequently, a transfer is delayed for a cell having a large average number of nulls.

Other and further aspects of the present invention will become apparent during the course of the following description and by reference to the accompanying drawing.

BRIEF DESCRIPTION OF THE DRAWING

FIGS. 4–8 illustrate tables that are used to collect the average duration of calls after a handoff;

FIGS. 5 and 6 illustrate tables that are used to maintain call duration statistics for active calls;

FIG. 16 illustrates a table utilized in the second embodiment of the invention;

FIG. 19 illustrates a table utilized in the third embodiment of the invention;

DETAILED DESCRIPTION

Figure 1:
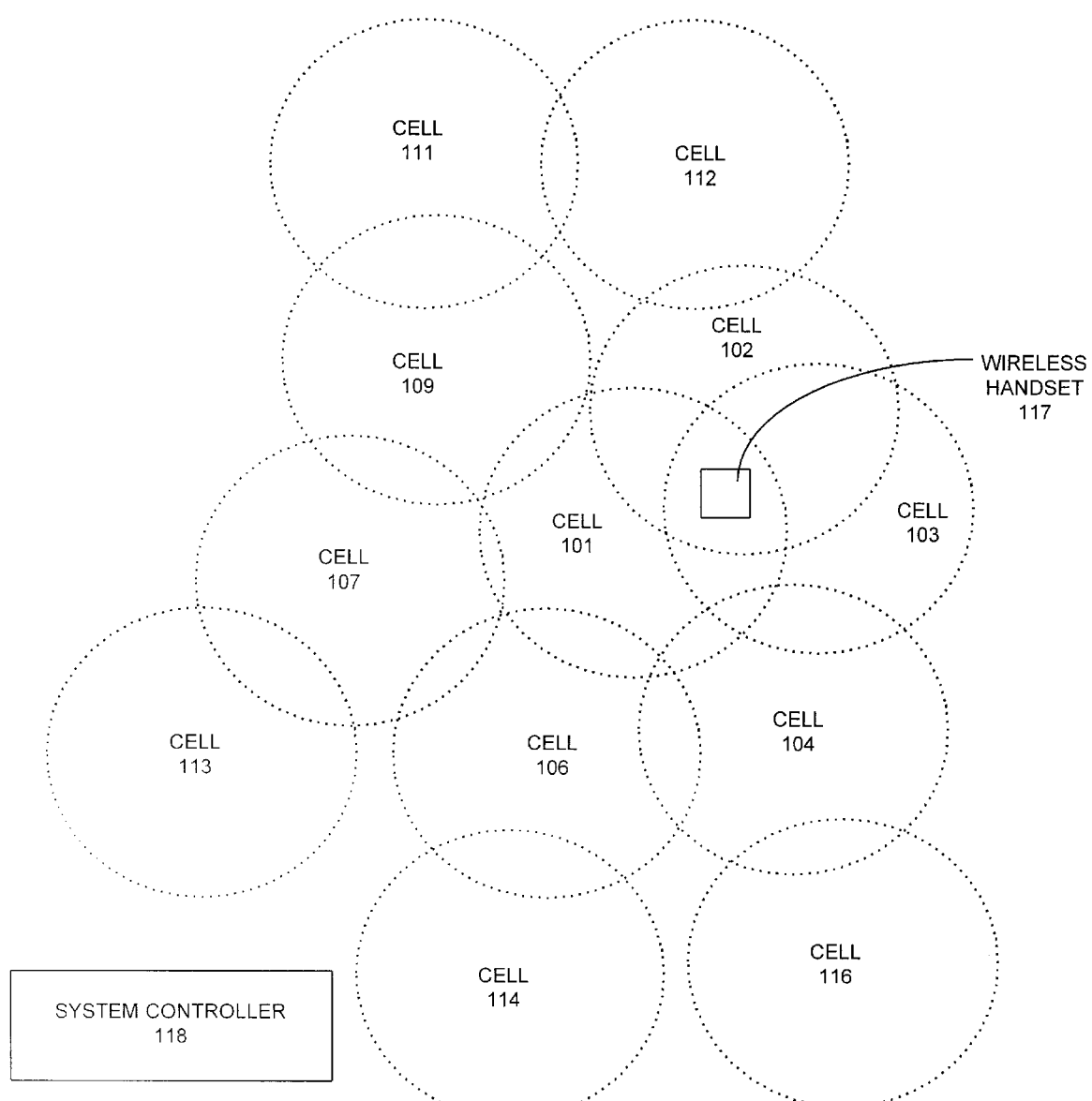
FIGS. 1–3 illustrate a wireless telecommunication switching system embodying the inventive concept.

FIG. 1 illustrates a wireless telecommunication system having a plurality of wireless cell sites (also referred to as cells) which are cells 101–116. This plurality of cells are providing service for wireless handsets such as wireless handset 117. Each cell consists of a base station which is not illustrated in FIG. 1 but is illustrated in detail in FIG. 13. The cells illustrated in FIG. 1 are under control of system controller 118. The geographical area covered by the cells is illustrated as being a circle; however, one skilled in the art would immediately recognize that the geographical area covered by each cell could be of a different configuration. System controller 118 controls the operation of the cells by controlling the base stations via communication links not illustrated in FIG. 1.

To understand the operation of the wireless communication system of FIG. 1, in accordance with a first embodiment of the invention, consider the following example. This example uses a handoff as the activity transfer being performed. Cell 101 has overlapping areas with cells 102–109. However, due to the traffic flow within the building which is serviced by the wireless communication system, users of wireless handsets do not in general leave cell 101 and enter cells 106–109. The normal traffic pattern is to leave cell 101 and enter cells 102–104. Cell 101 is currently active on a call with wireless handset 117. In the prior art, when the base station of cell 101 recognized that wireless handset 117 was leaving cell 101 due to a change in transmission signal strength, the base station informs system controller 118 of this fact. The base station of cell 101 realizes that wireless handset 117 is leaving its cell area as the signal strength of the transmission from wireless handset 117 goes below an acceptable level. System controller 118 then looks in a table associated with cell 101 to determine target cells. In the present example, the target cells are cells 102 through 109. System controller 118 requests that the base station in each of the target cells monitor transmission signal from wireless handset 117 for an adequate transmission signal. Each base station then must report back to system controller 118. Although, the wireless telecommunication system of FIG. 1 is illustrated as having a fairly small number of cells, in general, such a wireless telecommunication system has hundreds of cells. There are a large number of cells reporting back whether or not they were receiving the signal from a wireless handset in the process of doing a handoff at any given time. Hence, handoffs place a large real time processing load on system controller 118.

In accordance with the invention, when wireless handset 117 starts to move out of cell 101, system controller 118 selects a subset of cells 102–109 to interrogate the signal strength of wireless handset 117 to determine to which cell the handset should be handed off. In addition, system controller 118 randomly picks two other cells from the remaining cells illustrated in FIG. 1 to also interrogate the transmission signal strength of wireless handset 117. This is done so that system controller 118 can determine if the other cells can also be considered target cells from cell 101. The randomly selected cells are used to determine if indeed there are new cells that now can be considered target cells from cell 101. Relocation of base stations, new base stations, and structural changes in a building can result in new target cells. Note, in certain building environments, a structural change can be the moving of a shelf resulting in one cell becoming a potential target for another cell.

In the present example, system controller 118 accesses table 1 to determine the three target base stations of base station 101 which have the highest average call duration for handoffs. System controller 118 selects target base stations 102, 103, and 104 based on the average call durations illustrated in lines 401–403, respectively. System controller 118 then requests that these selected base stations and two randomly chosen base stations interrogate the signal transmission strength from wireless handset 117. Assuming that target base station 102 has an adequate signal strength, it will be selected for the handoff on the basis that its average call duration time is two minutes after a handoff from base station 101. In the present example, it is assumed that wireless handset 117 had been actively engaged in a call for one minute on base station 101 before the handoff occurred. When the handoff occurs to base station 102, table 2 illustrated in FIG. 5 has entry 501 inserted. Line 501 illustrates that the current base station is 102. The first previous/last base station is base station 101 and that the call duration had been one minute on base station 101.

The present example assumes that after wireless handset 117 has been active on base station 102 for 1.3 minutes, base station 102 determines that the signal strength from wireless handset 117 requires another handoff. Base station 102 makes a handoff request to system controller 118. System controller 118 accesses table 1 of FIG. 4 and determines from lines 408–411 that the target base stations for base station 102 are base stations 101, 103, and 112. System controller 118 requests that these base stations interrogate the signal transmission strength of wireless handset 117. Assuming that the transmission strength determined by base station 112 is adequate, system controller 118 selects base station 112 for the handoff based on the fact that its average call duration time is greater than the other two base stations. When the handoff occurs to base station 112, entry 501 is removed from table 2, and entry 601 is added to table 2 as illustrated in FIG. 6. When subsequently base station 112 hands off wireless handset 117 to cell 111, the statistics in line 601 will be used to update the average call duration time given in line 401 of FIG. 4 where base station 102 is the target for base station 101. This updated material is illustrated in table 1, line 701 of FIG. 7. The average duration of line 701 is the total duration of the call as handled by base station 101 and 102 and is 2.3 minutes. This results in a new average call duration of 2.03 in line 701.

If the call is terminated after being handed off to base station 102 after 1.3 minutes, the average call duration utilized to update table 1 of FIG. 7 is 2.5 minutes with an extra 0.2 minutes being added to emphasize that base station 102 may be a final destination for users traveling through base station 101.

If on the other hand, system controller 118 had not been able to perform a successful handoff from base station 102 upon being requested to do so, the total time utilized for the call to update table 1 of FIG. 7 is 2.1 minutes with 0.2 minutes being subtracted to emphasize that base station 102 may not be a good target base station for base station 101.

Figure 2:
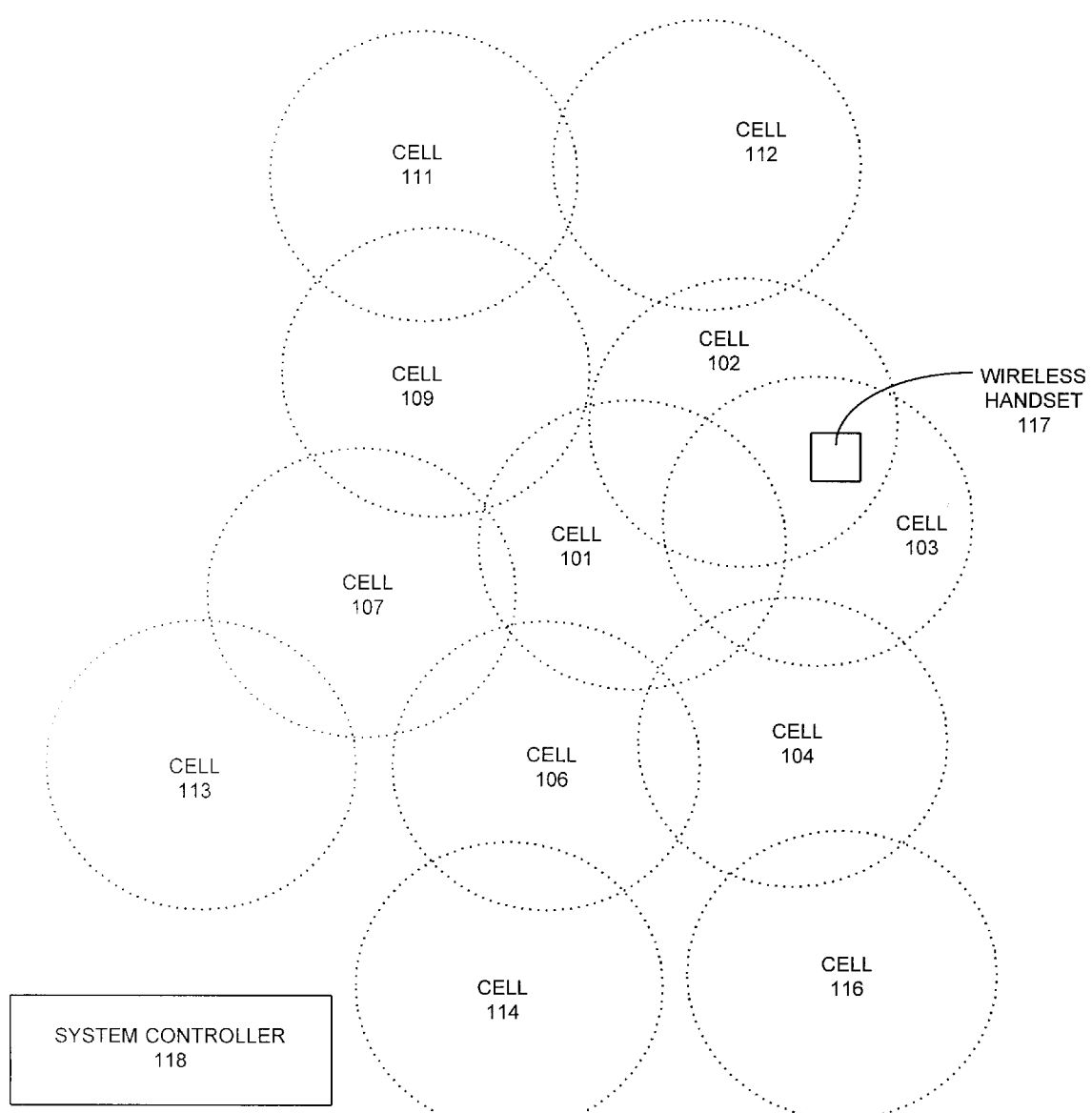
Figure 3:
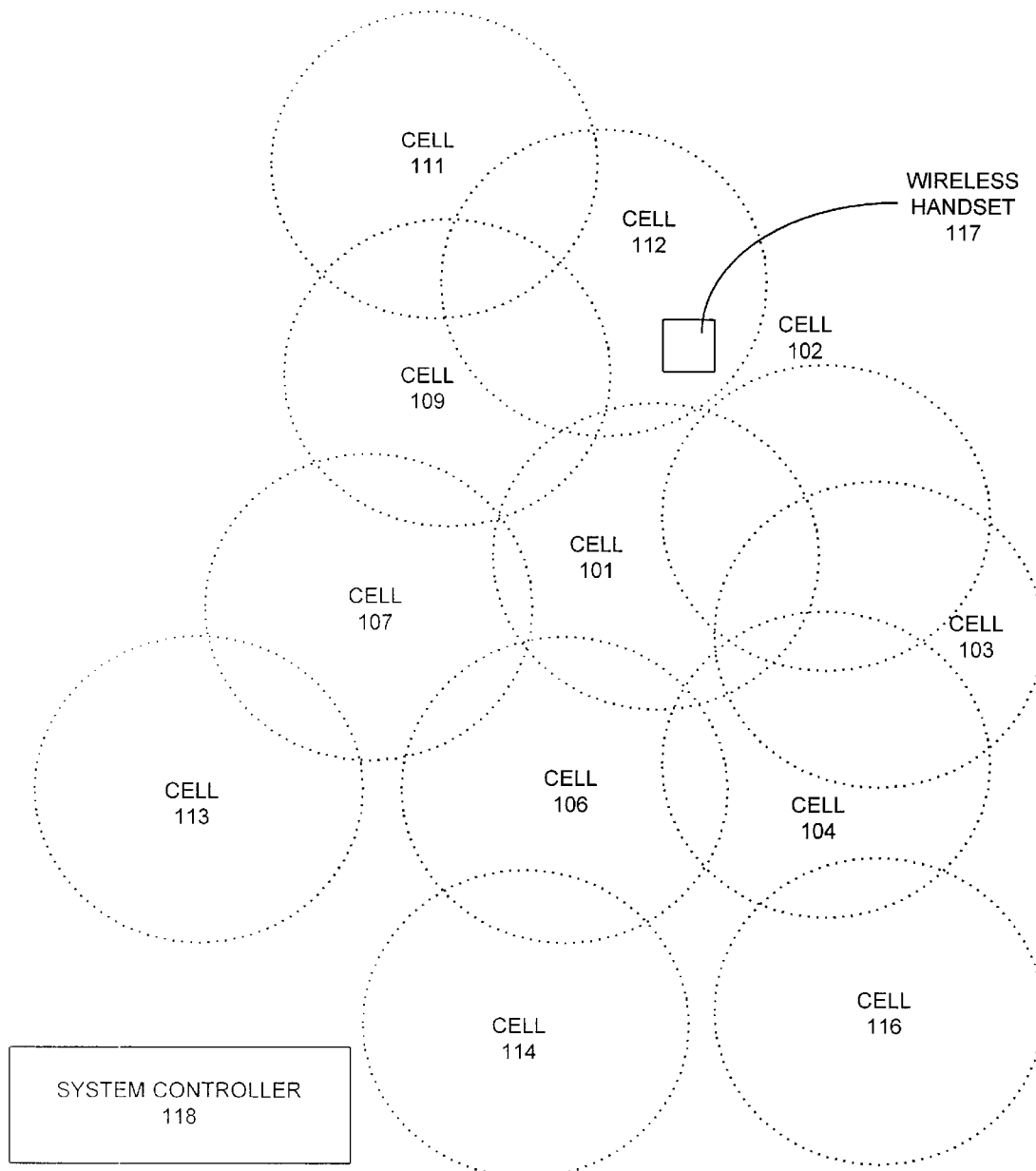

The present example has been based on the configuration of cells as illustrated in FIGS. 1 and 2. If the cell configuration changes due to a relocation of base station 112 as illustrated in FIG. 3, system controller 118 learns about the fact that cell 112 is now a target for cell 101 when cell 112 is randomly selected for the handoff. When this occurs, table 1 is updated as illustrated in FIG. 8 where base station 112 in line 801 has replaced the entry for base station 109 in line 407 of FIG. 4.

The operations performed by system controller 118 are illustrated in greater detail in FIGS. 9–12. When the operation of system controller 118 is initially started, control is transferred from block 901 to decision block 902. The latter decision block determines if a handoff request is being received from a wireless handset. If the answer is no, control is transferred to decision block 1201 of FIG. 12. If the answer is yes in decision block 902, control is transferred to block 903 which selects the three highest rated base stations that are target stations for the current base station serving the wireless handset from table 1. The highest rated base stations are those having the longest average call duration. From block 903, control is passed to block 904. Block 904 then selects at random two other base stations from the wireless telecommunication system as illustrated in FIG. 3. Note, in both blocks 903 and 904, a base station is not selected as a target unless it has at least one idle channel to perform the handoff. After execution of block 904, control is transferred to block 906 which sends messages to the selected base stations requesting that the wireless handset's transmission signal strength be interrogated. Next, decision block 907 determines if any of the selected base stations are detecting an adequate signal strength from the wireless handset. If the answer is no in decision block 907, this means that a handoff has failed for the current base station, and control is transferred to block 1101 of FIG. 11. If the answer is yes in decision block 907, control is transferred to block 908 which sends a message to the base station that has the highest rating and is receiving adequate signal strength to perform the handoff. After execution of block 908, control is transferred to block 1001 of FIG. 10.

Figure 10:
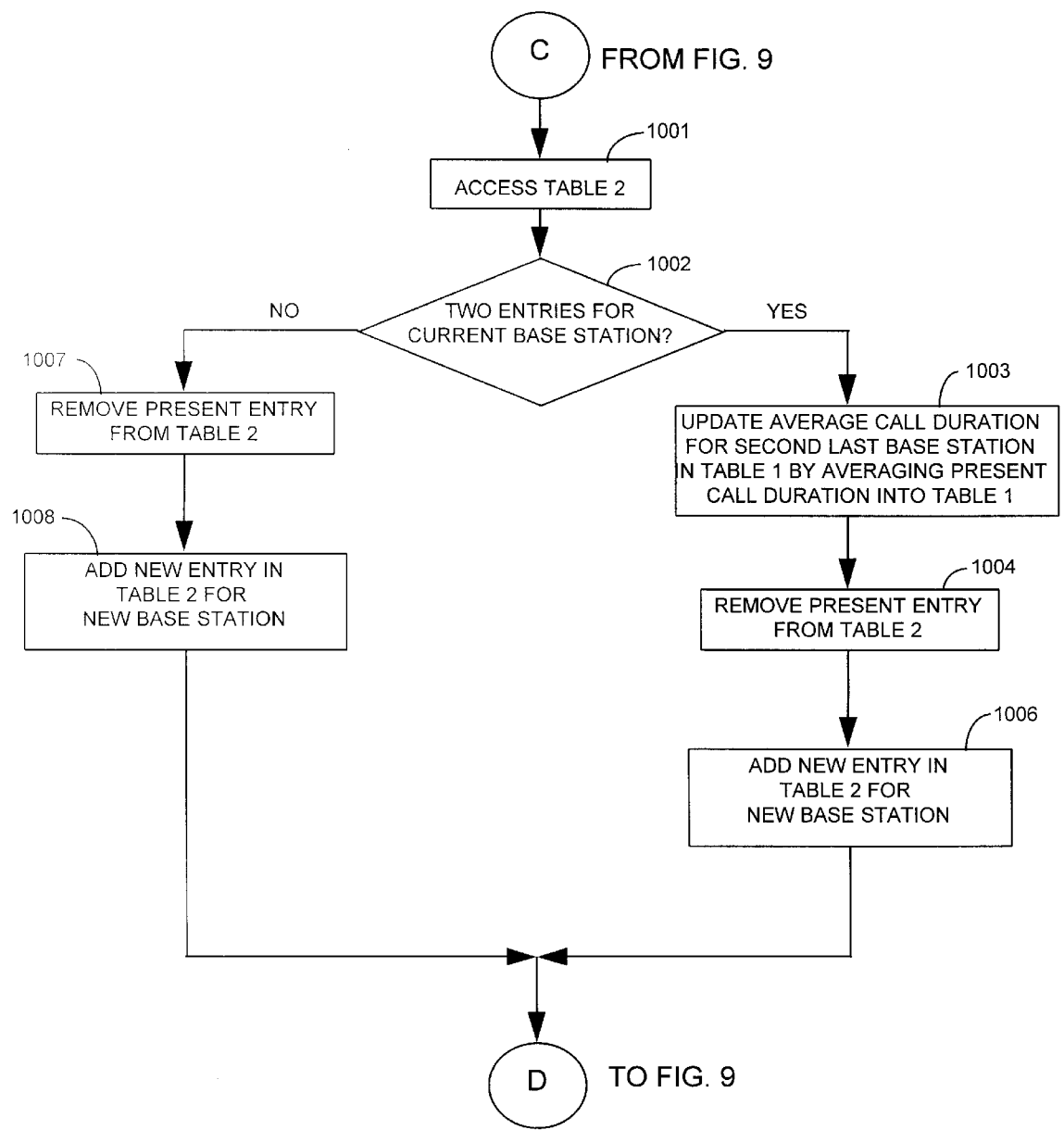

FIG. 10 illustrates the operations for updating table 2 when a successful handoff has been performed. In block 1001, table 2 is accessed using the base station number from which the handoff has just been performed. This base station number is denoted as "current base station number". The base station to which the handoff was done is referred to as the "new base station". Control is then passed to decision block 1002, it determines whether there are two entries listed for the line associated with the current base station number in table 2. If the answer is no, control is transferred to block 1007. In the previous example this is illustrated by line 501 of FIG. 5. Block 1007 removes the current entry from table 2 which in the previous example results in the removal of line 501. Block 1008 then adds a new entry in table 2 for the new base station. In the previous example this is illustrated as line 601 of FIG. 6.

Returning to decision block 1002, if the answer is yes in decision block 1002, control is transferred to block 1003. In the previous example, this operation is performed when a handoff was done from base station 112 to base station 111. Block 1003 updates the average call duration for the second last base station in table 1 by averaging the present call duration into the number currently present in table 1. In the example, this is illustrated when line 701 of FIG. 7 is updated for base station 101. After execution of block 1004, the current entry is removed from table 2, and a new entry is made into table 2 for the new base station by block 1006. From both blocks 1006 and 1008, control is transferred back to decision block 902 of FIG. 9.

Figure 9:
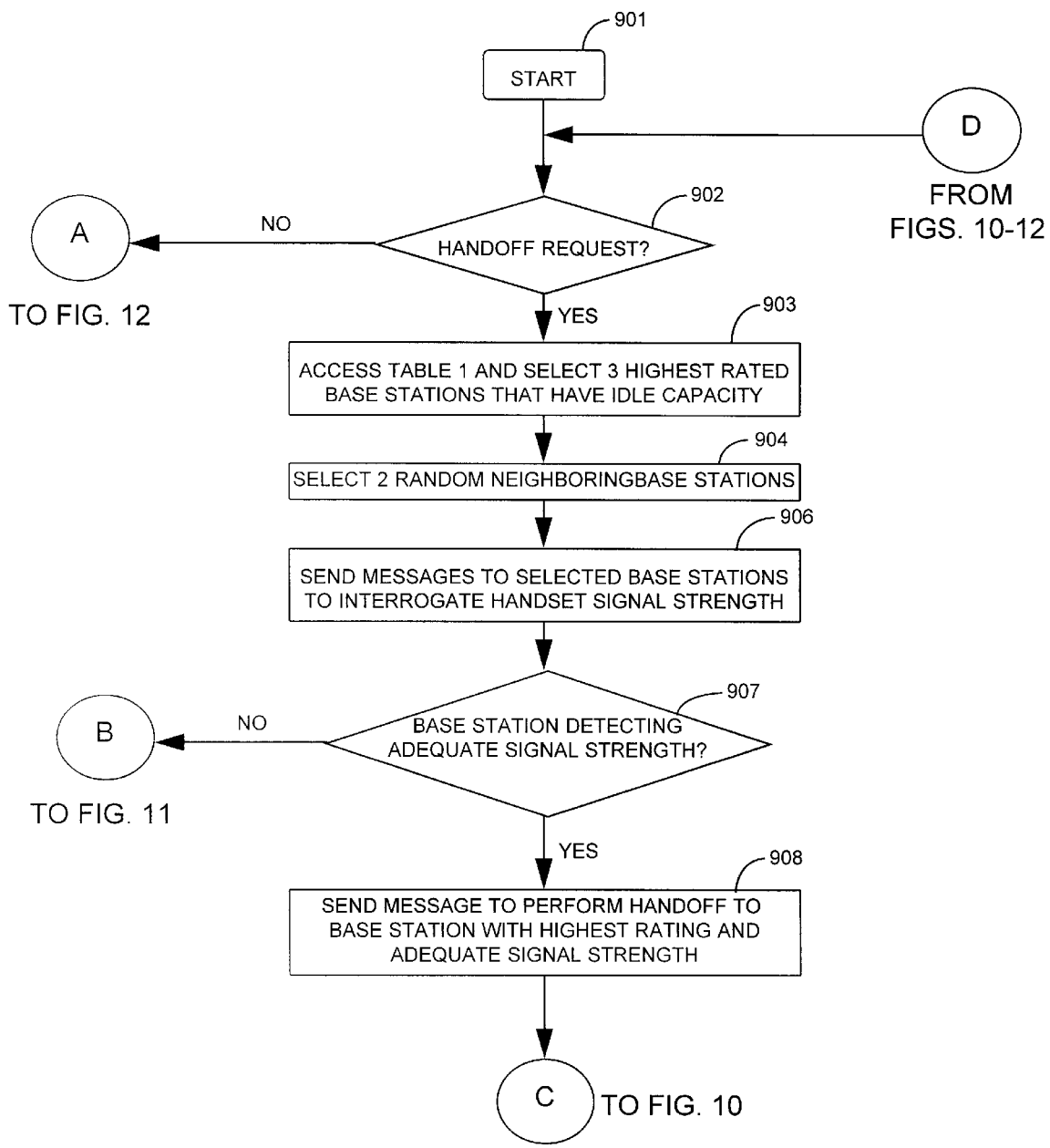
FIGS. 9–12 illustrate the operations performed by a system controller.
Figure 11:
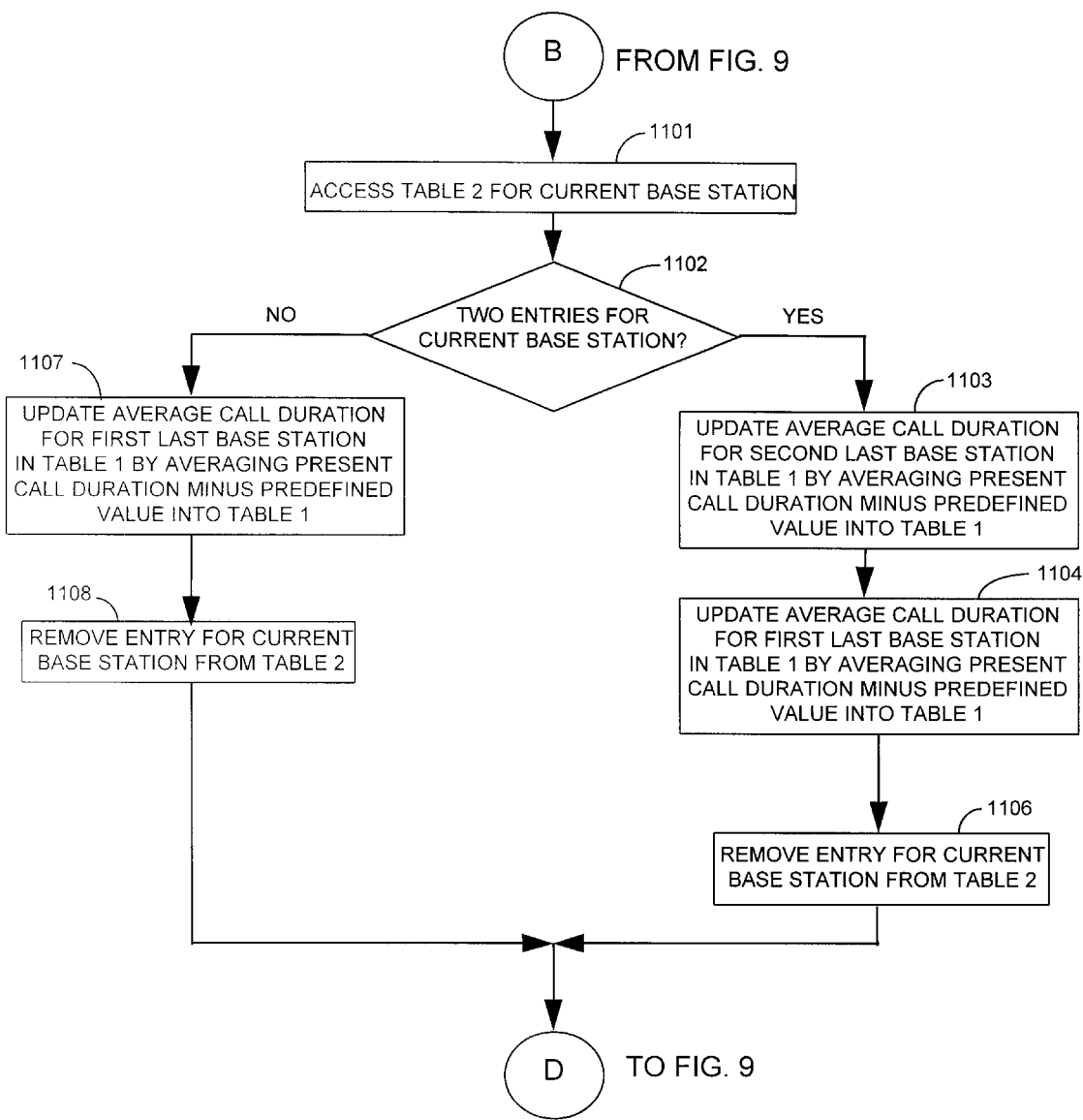

Returning to decision block 907 of FIG. 9, if the answer is no, this indicates the handoff failed to the target base station, and control is transferred to block 1101 of FIG. 11. Block 1101 accesses table 2, and decision block 1102 determines if there are two entries in the line associated with the current base station. If the answer is no, then the average call duration for the base station identified as the first last base station in table 2 is performed in table 1. Note, the the call duration listed for the first last base station in table 2 is averaged into the entry in table 2 minus a predefined value. This predefined value may advantageously be 0.2 seconds. After execution of block 1107, block 1108 removes the entry for the current base station from table 2 and transfers control back to decision block 902 of FIG. 9. Returning to decision block 1102, if the answer is yes, control is transferred to block 1103 which updates the average call duration for the second last base station in table 1 again subtracting from the present call duration given in table 2 the predefined value. Block 1104 then updates the average call duration for the first last base station of table 2 in table 1 again subtracting the predefined value from the average time duration listed in table 2. Finally, block 1106 removes the entry for the current base station from table 2 before transferring control back to decision block 902 of FIG. 9.

Figure 12:
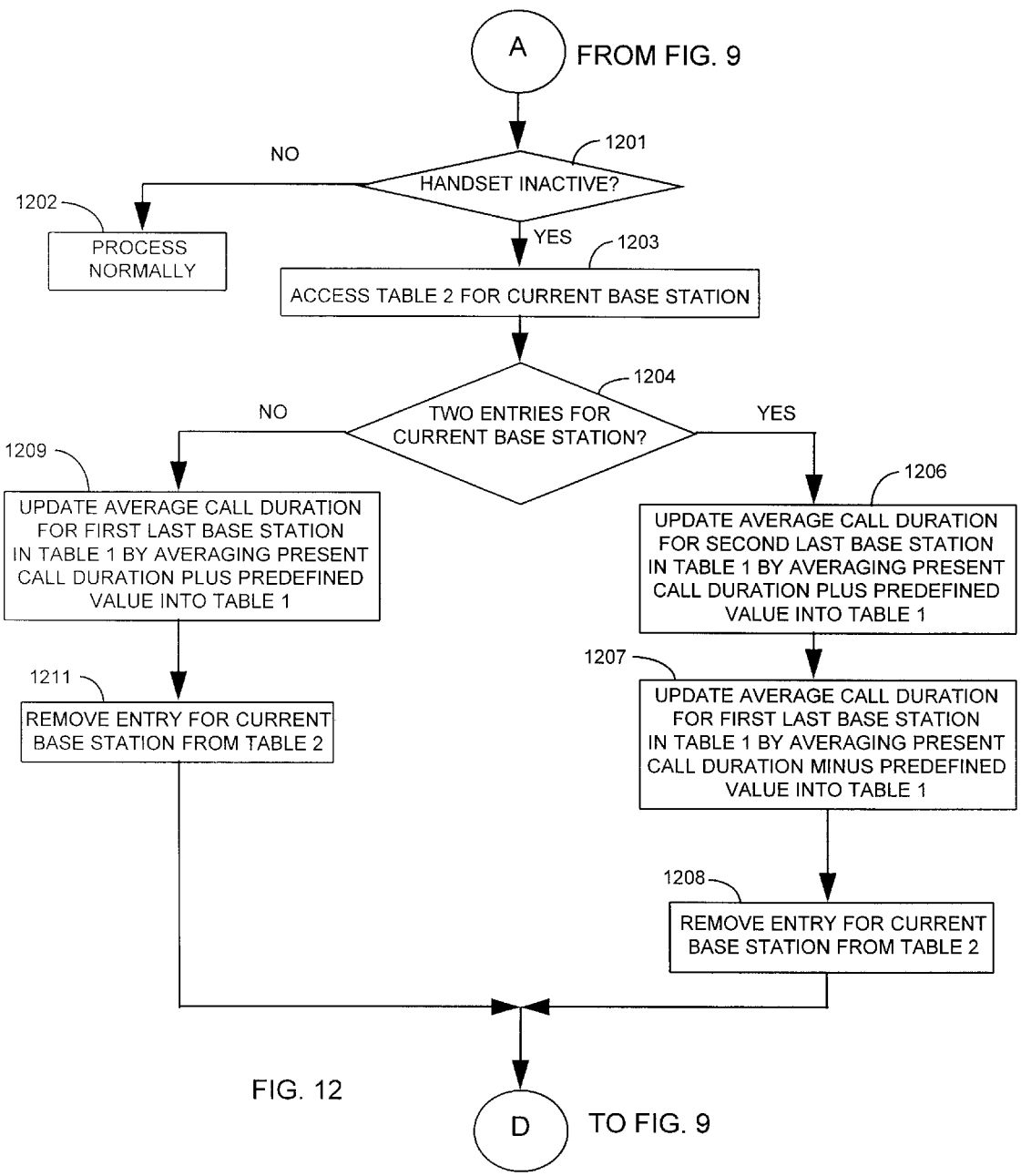

Returning to decision block 902 of FIG. 9, if a handoff is not being requested by the station set, control is transferred to decision block 1201 of FIG. 12. If the operation is not a call hangup by a wireless handset, control is transferred from decision block 1201 to block 1202 for normal processing. If a wireless handset has terminated a call by hanging up, control is transferred to block 1203 which accesses table 2 for the current base station. Decision block 1204 then determines whether there are two entries for the current base station in table 2. If the answer is no, blocks 1209 and 1211 perform the same operations as blocks 1107 and 1108 of FIG. 11 with the exception that the predefined value is added to the present call duration rather than being subtracted. If the answer in decision block 1204 is yes, blocks 1206–1208 perform the same operations as blocks 1103–1106 of FIG. 11 with the exception that the predefined value is added to the present call duration rather than being subtracted. After execution of either block 1208 or 1211, control is transferred back to decision block 902 of FIG. 9.

Figure 13:
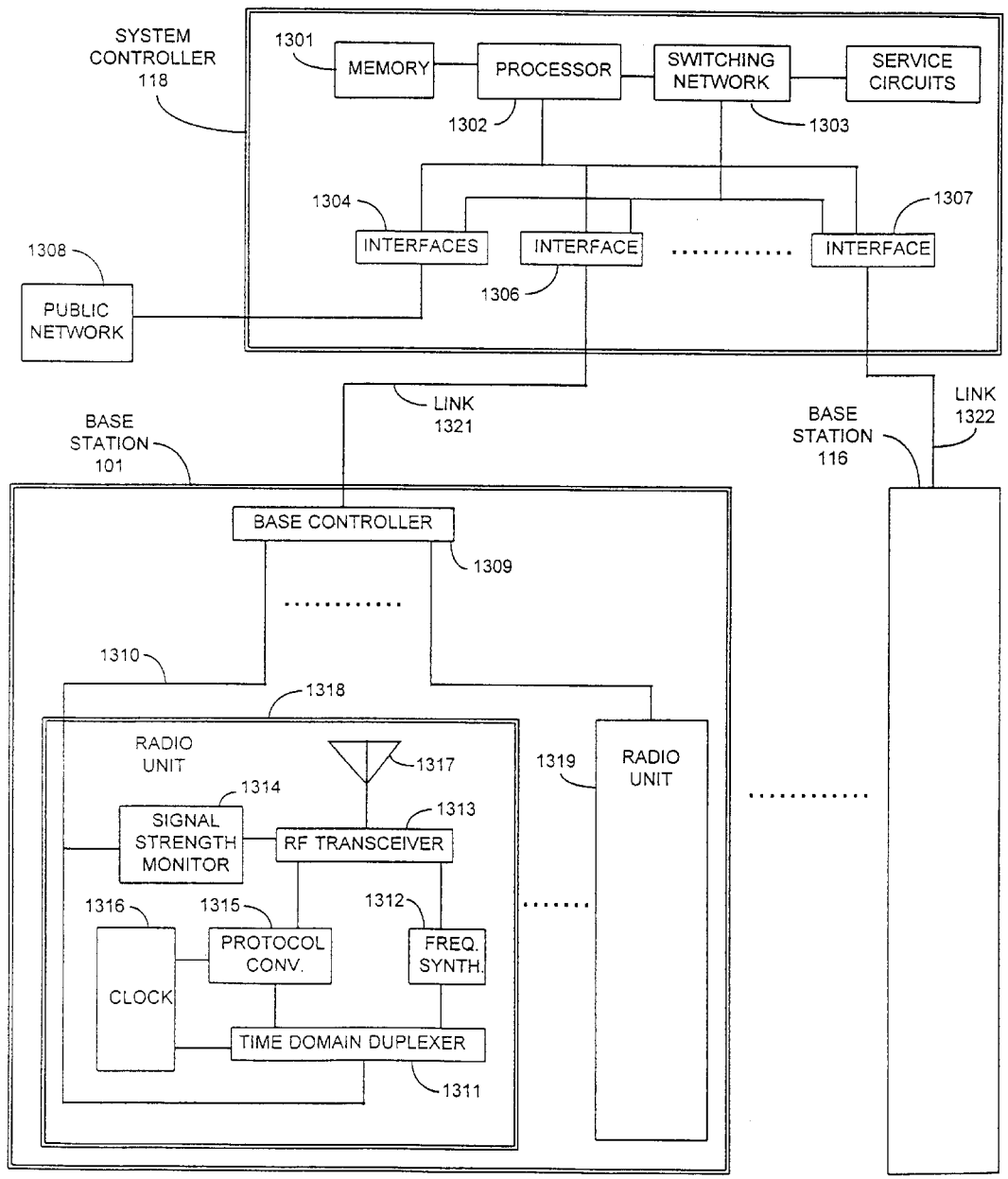
FIG. 13 illustrates, in block diagram form and greater detail, the wireless telecommunication system of FIGS. 1–3.

FIG. 13 illustrates, in block diagram form, the wireless telecommunication system illustrated in FIGS. 1–3. System controller 118 is under the control of processor 1302 which executes programs and utilizes data stored in memory 1301. For example, memory 1301 stores tables 1 and 2. System controller 118 interfaces to public network 1308 via interfaces 1304. System controller 118 is interconnected to base stations 101–116 via links 1321–1322 which terminate on interfaces 1306–1307. The switching of audio and data received via interfaces 1306–1307 is performed by switching network 1303 under control of processor 1302. Base station 101 illustrates in greater detail the composition of a base station. Each base station comprises a plurality of radio units 1318–1319 that are under the control of base controller 1309. Base controller 1309 is responsive to the message requesting that a wireless handset's transmission signal strength be interrogated to adjust the frequency of RF transceiver 1313 to the channel used by the wireless handset by controlling frequency synthesizer 1312 via time domain duplexer 1311 and bus 1310. Signal strength monitor 1314 reports the relative signal strength of the wireless handset to base controller 1309 via bus 1310.

Figure 14:
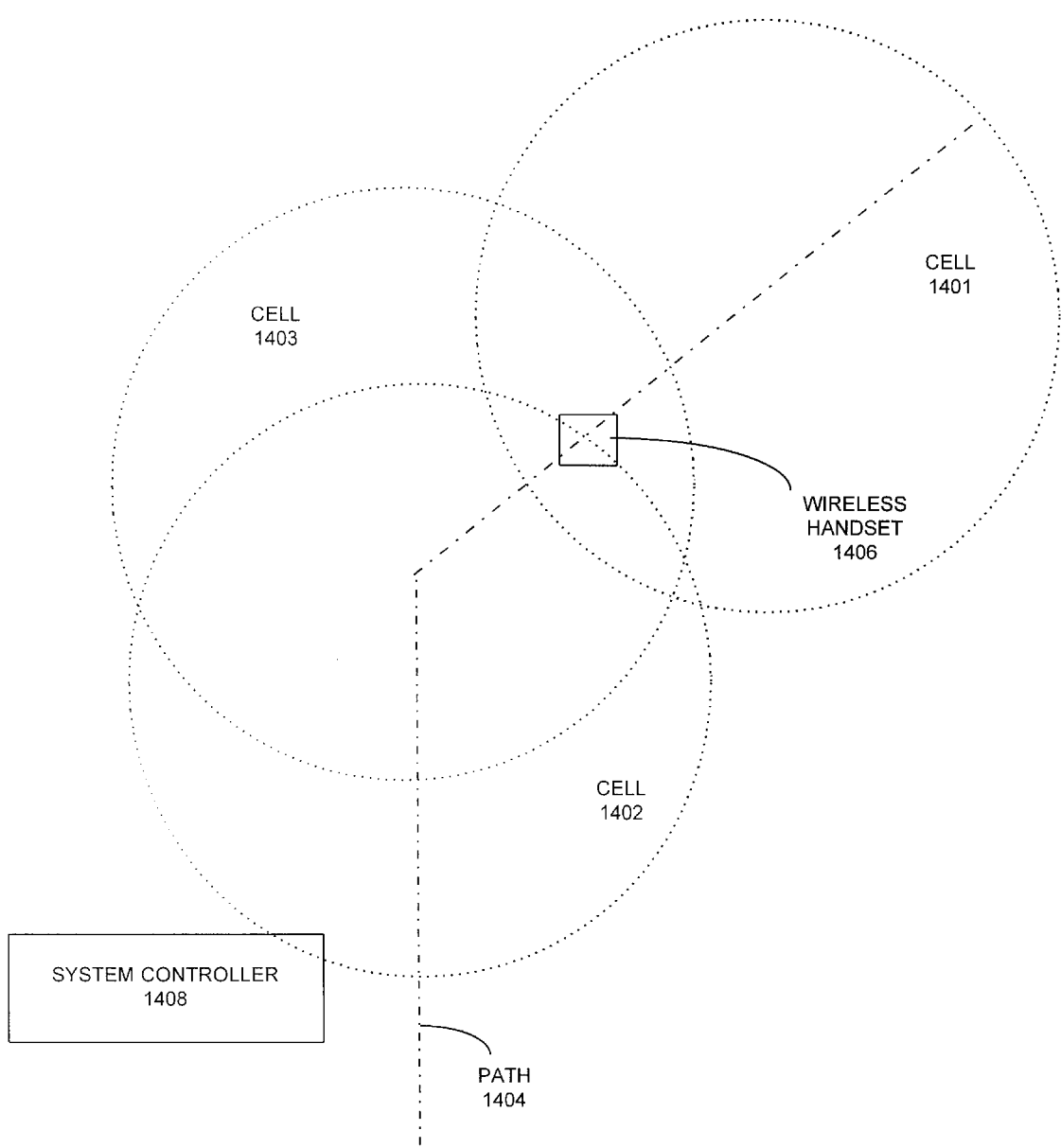
FIG. 14 shows a wireless telecommunication system implementing a second embodiment.

Consider now a second embodiment of the invention. FIG. 14 illustrates path 1404 which is a path that is traveled frequently by users of the wireless telecommunication system. For example, this could be the main path to the cafeteria or other such facility. When wireless handset 1406 entered cell 1402 it was handed off to cell 1402. As illustrated in FIG. 14, wireless handset 1406 is now at the boundary of cell 1402 and must be handed off to either cell 1403 or 1401. Since wireless handset 1406 is closer to the center of cell 103, the normal choice would be to hand wireless handset 1406 off to cell 1403. However, wireless handset 1406 is moving away from the center of cell 1403 and towards the center of cell 1401. Hence, cell 1401 is the best cell for the hand off of wireless handset 1406. This second embodiment is directed towards detecting and allowing the dynamic learning within system controller 1408 to account for paths such as path 1404. When wireless handset 1406 is handed off to cell 1401, wireless handset 1406 continues to measure the received transmission power from cell 1401. After wireless handset 1406 is handed off to another cell, wireless handset 1406 communicates the maximum transmission power that was detected while in cell 1401 to system controller 1408. Similarly, when wireless handset 1406 is handed off to cell 1403, it also measures the maximum power that was received. System controller 1408 maintains an average power for each cell to which another cell can hand off. For example, cell 1402 has a table associated with it that indicates the average of the maximum transmission power that had been detected by handsets being handed off from cell 1402 to cells 1403 and 1401. Using this average power information, system controller 1408 determines the cell to which the handoff is to occur based on the maximum average power that had been previously detected in handoffs to that cell in the same manner that was previously described with respect to FIG. 9. The first embodiment is applied to processing registration in a similar manner as handoffs. An exception is that for registrations decision block 1201 will detect when the wireless handset is inactive rather than when the call has been terminated.

Figure 15:
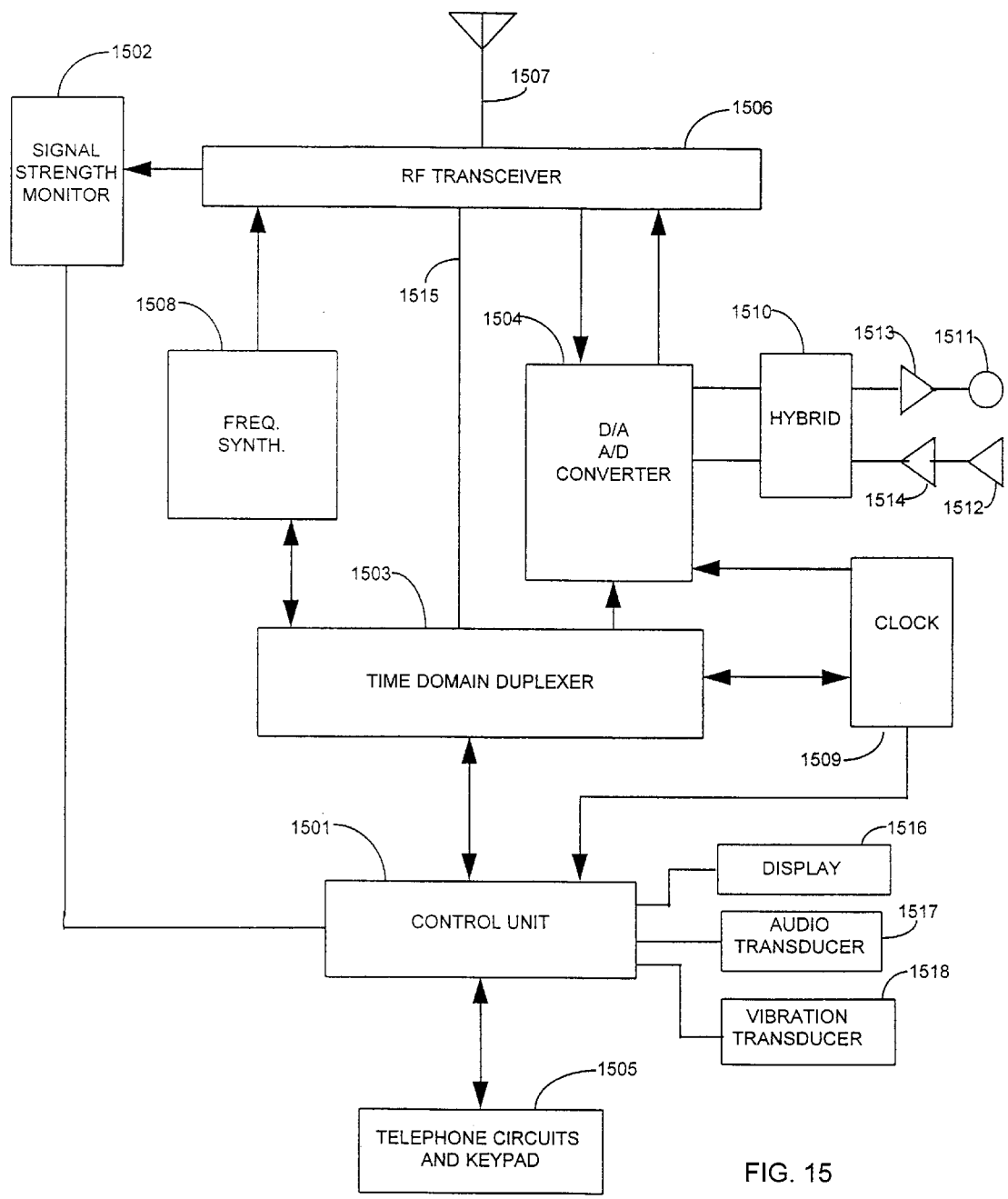
FIG. 15 illustrates a wireless handset.

In the second embodiment, it is assumed that wireless handset 1406 is as illustrated in FIG. 15. Handset 1406 is implementing a wireless protocol that allows wireless handset 1406 to maintain a wireless signal link with system controller 1408 via the base stations in the cells. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. In the second and third embodiment, only the signal protocol of PHS protocol is used and not the handoff method of the PHS protocol. Control unit 1501 of wireless handset 1406 uses user information messages to communicate the transmission power to system controller 1408. At regular intervals, control unit 1501 records the maximum transmission power being received from cell 1401 using signal strength monitor 1502. When wireless handset 1406 is handed off to another cell from cell 1401 or the call terminates, control unit 1501 transmits the maximum transmission power that had been received while wireless handset 1406 was active on a call with cell 1401. For the present example, FIG. 16 illustrates in table 3 the results of handoffs from cell 1402 to cells 1401 and 1403. When a handset is handed off from one cell to another cell, system controller 1408 is responsive to the message defining the maximum transmission power experienced by the wireless handset for the cell handing off to update a table such as illustrated in FIG. 16 for the cell that had done the previous hand off.

Figure 17:
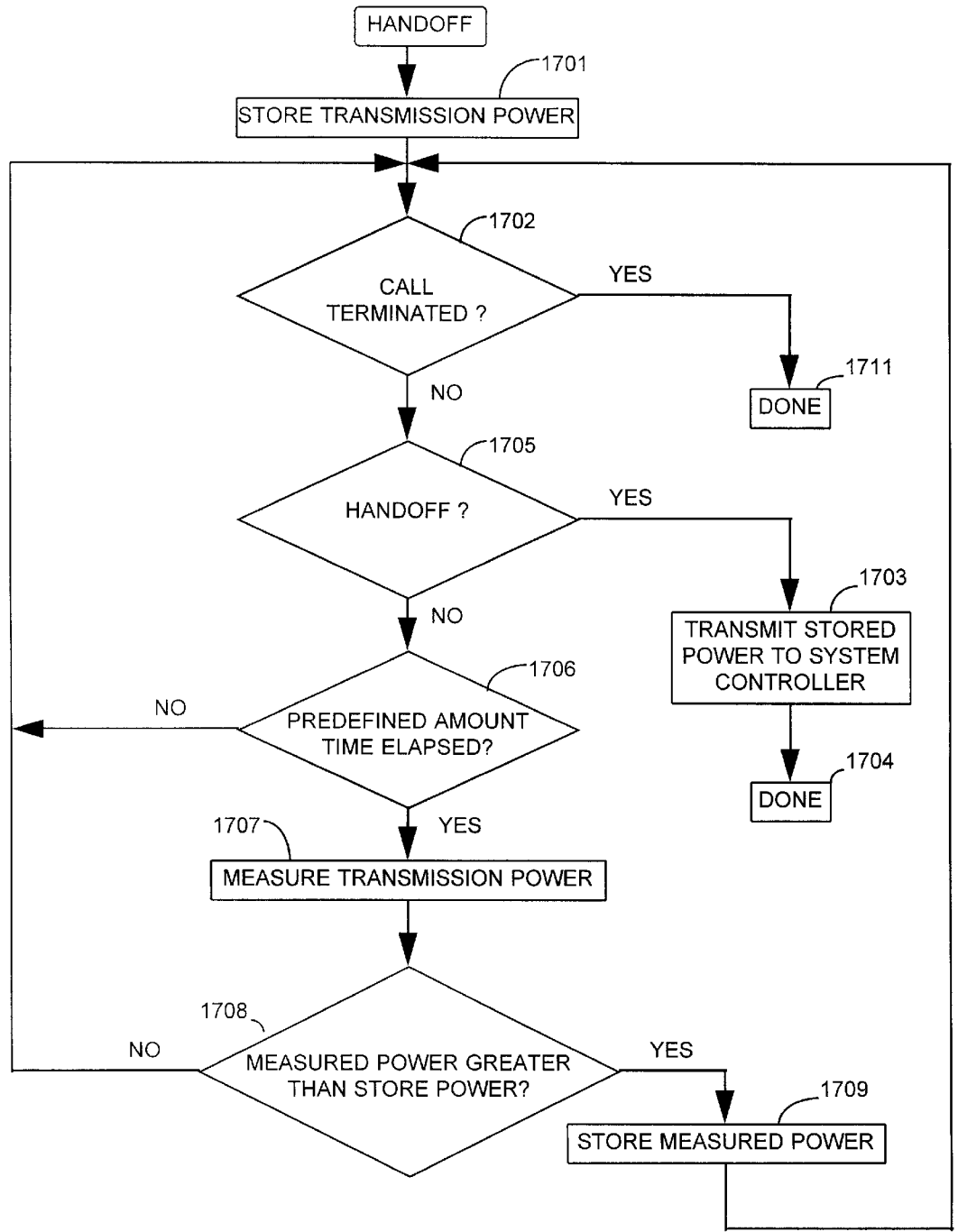
FIG. 17 illustrates the steps performed by a wireless handset utilized in the second embodiment of the invention.

FIG. 17 illustrates the operations performed by wireless handset in implementing the second embodiment. When a handoff occurs, block 1701 measures the transmission power of the base station to which the wireless handset has just been handed off. In addition, block 1701 stores this value for the transmission power before transferring control to decision block 1702. Decision block 1702 determines if the call has been terminated. If the answer is yes, the operations illustrated in FIG. 17 are done, and block 1711 causes the handset to perform normal operations. If the decision in decision block 1702 is no, decision block 1705 determines if a handoff has occurred. If a handoff has not occurred, control is transferred to decision block 1706 which determines if a predefined amount of time has elapsed. If the answer is yes, block 1707 measures the transmission power of the base station. Then, decision block 1708 determines if the measured transmission power is greater than the value of transmission power that is stored. If the answer is yes, block 1709 replaces the previously stored transmission power with the measured transmission power before returning control to decision block 1702. If the answer in decision blocks 1706 or 1708 is no, control is returned to decision block 1702. Returning to decision block 1705, if a handoff has occurred, control is transferred to block 1703 which transmits the stored transmission power to the system controller and resumes normal operations by execution of block 1704.

Figure 18:
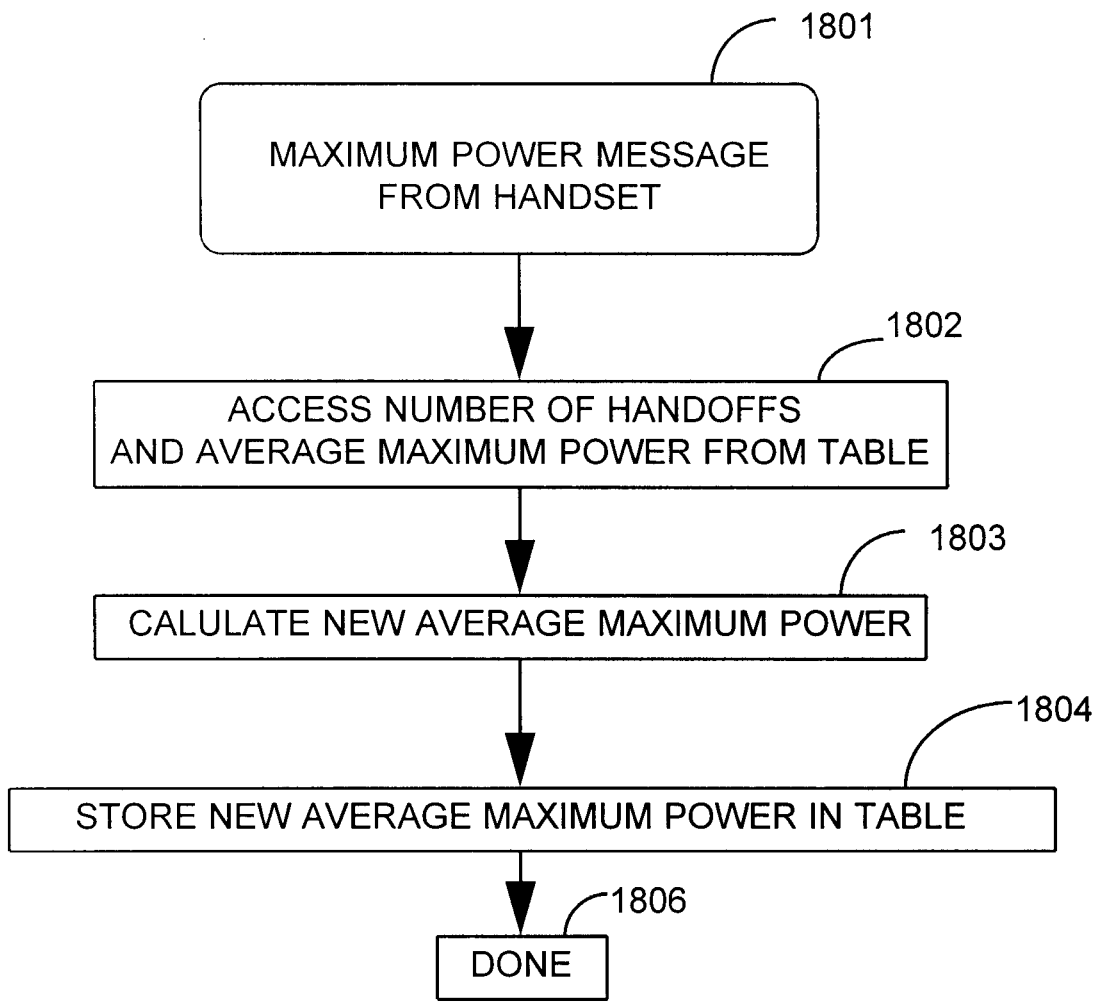
FIG. 18 illustrates the steps performed by a system controller utilized in the second embodiment of the invention.

FIG. 18 illustrates the operations performed by system controller 1408 of FIG. 14. When a maximum power message is received from a wireless handset by block 1801, block 1802 accesses table 3 of FIG. 16 and obtains the number of handoffs and the average maximum power for the present base station. In table 3, the present base station is denoted as the target base station number. The base station from which the last handoff occurred is denoted as the current base station number in table 3. Block 1803 then calculates a new average maximum power, and block 1804 inserts this new average maximum power number into table 3. Operations are terminated by execution of block 1806. The second embodiment is applied to processing registrations in a similar manner as handoffs. The exceptions are that for registrations decision block 1702 detects when the wireless handset is inactive rather than when the call has been terminated and decision block 1705 detects a new registration rather than a handoff.

A third embodiment is directed to the problem of solving multipath fading. Multipath fading is caused when the handset is receiving the transmission signal from the base station but that signal is taking a number of paths to the handset. At a certain point, the signals from these paths cancel each other out. The point at which this occurs is called a null. At the frequencies used by PCS handsets, these null points often are only a few inches in distance but can cause a handset to do a handoff to a base station that actually has weaker overall transmission power than the base station which was experiencing the multipath fading. The third embodiment is directed to detecting paths such as path 1404 that experience multipath fading for example from the base station of cell 1401. This is done by the wireless handset continuing to monitor the transmission power of the base station from which the handset had just been handed off for a predefined period of time. If the transmission power returns to an acceptable communication level, the wireless handset utilizes a facility message to transmit that a null occurred to system controller 1408. System controller 1408 maintains a table for each cell such as illustrated in FIG. 19. For each pair of current base station numbers and target base station numbers in table 4 of FIG. 19, system controller 1408 maintains an average number of nulls that have been detected per handoff. Using this average number of nulls, system controller 1408 determines whether to delay the handoff for a predefined time. Advantageously, this predefined amount of time is two seconds. System controller 1408 delays the handoff if the average number of delays is greater than a second predefined number. Advantageously, this second predefined number is 0.5. It is assumed that the wireless handset illustrated in FIG. 15 is utilized. In this case, control unit 1501 monitors the power transmission strength utilizing signal strength monitor 1502. In the PHS protocol, control unit 501 does this by monitoring the previous base station in the paging channel.

Figure 20:
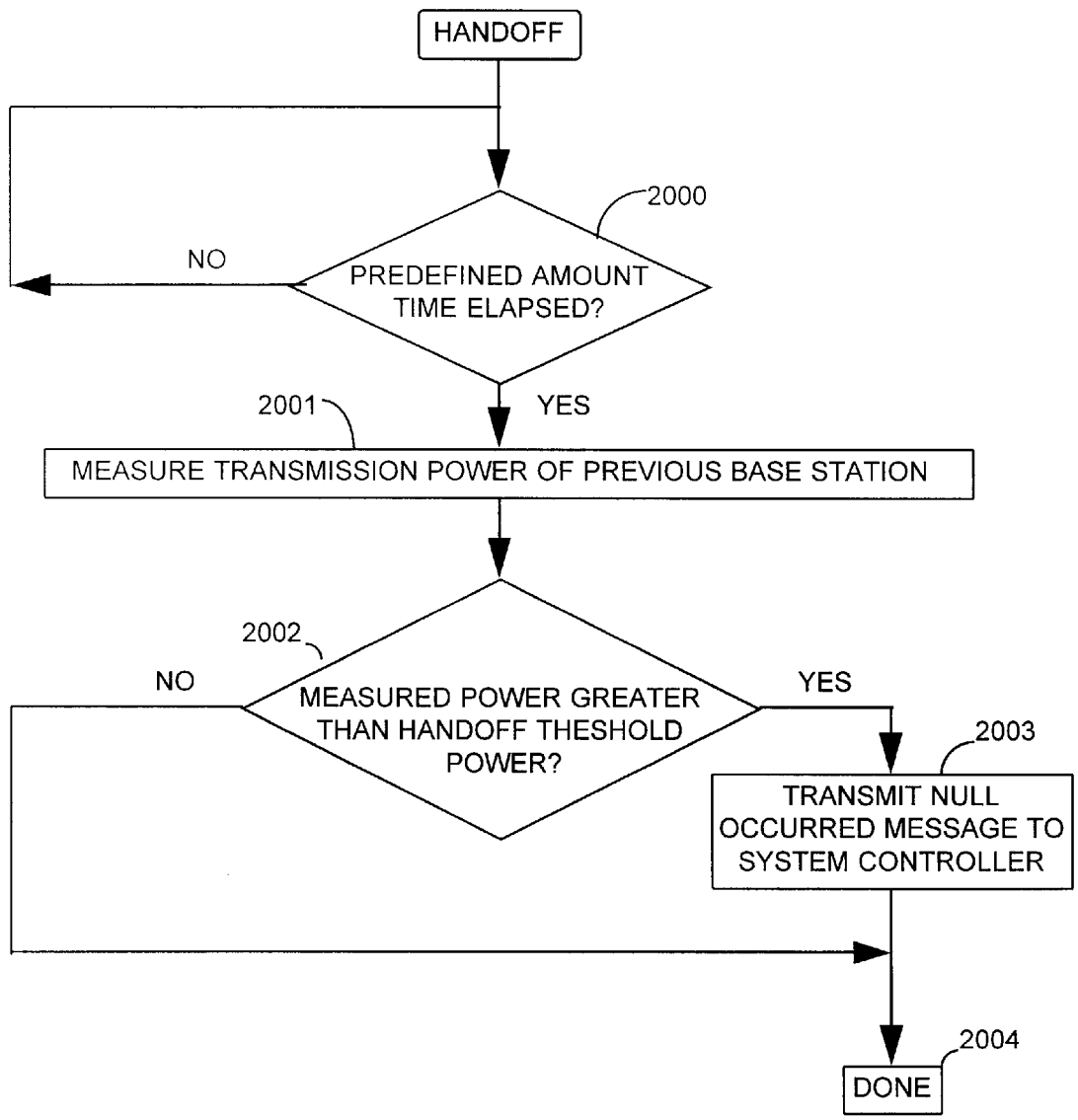
FIG. 20 illustrates the steps performed by a wireless handset utilized in the third embodiment of the invention.

FIG. 20 illustrates the operations performed by wireless handset in implementing the third embodiment of the invention. After a handoff has occurred, decision block 2000 waits for a predefined amount of time to elapse, and then, transfers control to block 2001. Block 2001 measures the transmission power of the previous base station. Decision block 2002 then determines if the measured power is greater than the handoff threshold power. If the answer is yes, block 2003 transmits a null occurred message to system controller 1408, and block 2004 returns the handset to normal operations.

Figure 21:
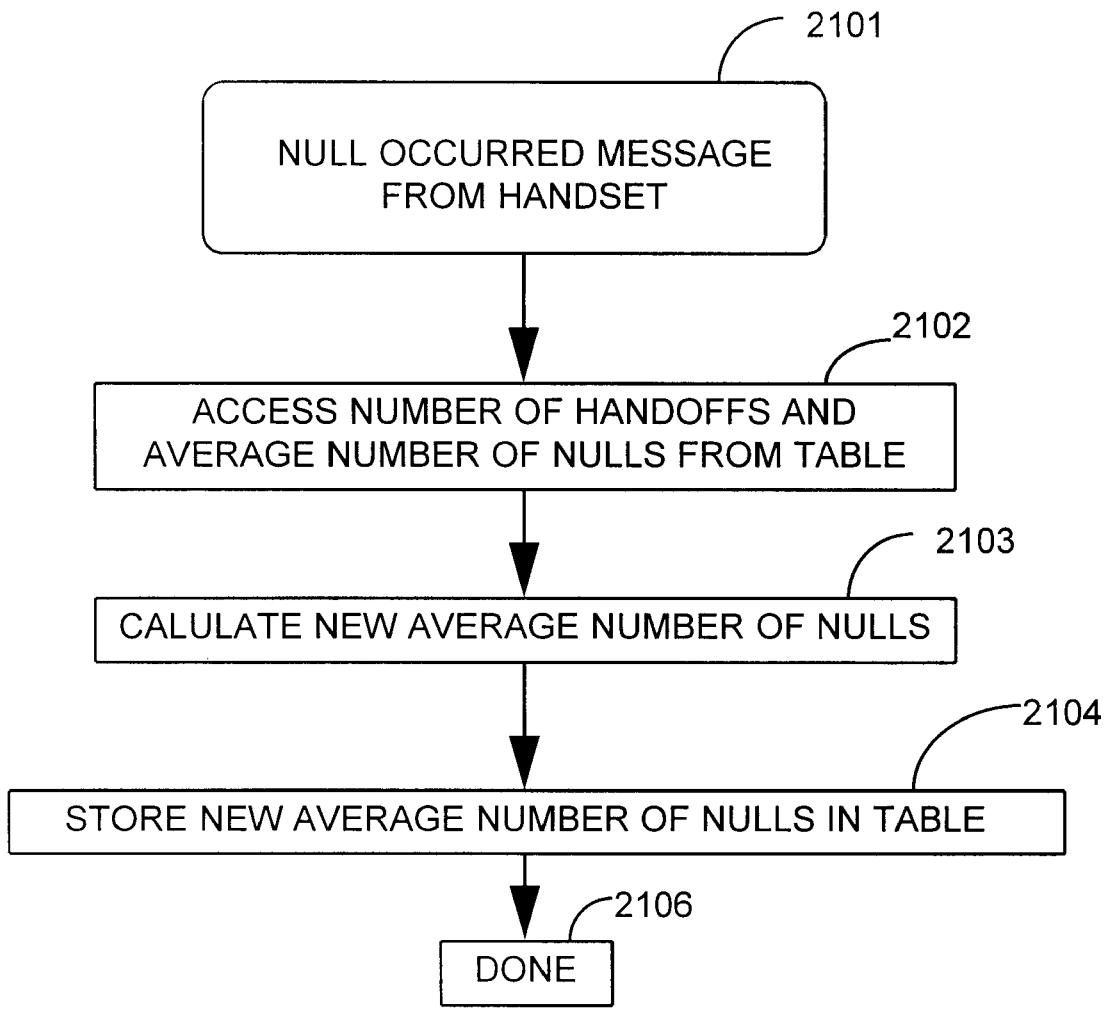
FIG. 21 illustrates the steps performed by a system controller utilized in the third embodiment of the invention.

FIG. 21 illustrates the operations performed by system controller 1408 in implementing the third embodiment. Block 2101 transfers control to block 2102 when a null occurred message is received from the wireless handset. Block 2102 accesses table 4 of FIG. 19 utilizing the present base station as the target base station number and the previous base station as the current base station number. Block 2103 calculates a new average number of nulls utilizing the number of handoffs and the average number of nulls. Block 2104 then stores this new average number of nulls in table 4 before block 2106 returns the system controller to other operations. The third embodiment is applied to processing registrations in a similar manner as handoffs.

It is to be understood that the above-described embodiments are merely illustrative of the principles of the invention and that other arrangements may be devised by those skilled in the art without departing from the spirit and scope of the invention. In particular, it would be apparent to one skilled in the art that the three different embodiments could be combined together. Also, one skilled in the art could readily envision how to adapt the principles of the invention to arrangements where the wireless handset controlled the handoff.

The invention claimed is:

1. A method of learning of target base stations to which activity transfers of wireless handsets can be made from a current base station in a wireless switching system, comprising the steps of:

performing activity transfers from the current base station to each of the target base stations;

measuring performance of each of the target base stations in maintaining the activities of the wireless handsets and the step of measuring comprises the step of calculating an average duration of activity time of the wireless handsets in each of the target base stations after each of the activity transfers from the current base station;

recording the measured performance of each of the target base stations; and determining subsequently one of the target base stations to which to do a activity transfer based on the recorded measured performance of the target base stations.

2. The method of claim 1 wherein the step of determining comprises the step of selecting the one of target base station having the longest average duration of activity time.

3. The method of claim 2 wherein the step of calculating comprises the step of including into the average duration of activity time an additional amount of time that activity of each of the wireless handsets is maintained by another base station after an activity transfer has occurred from each of the target base stations to the other base station.

4. The method of claim 2 wherein the step of performing comprises the steps of doing activity transfers to randomly selected base stations other than the target base stations and executing the step of measuring for the randomly selected base stations; and designating one of the randomly selected base stations as a target base station upon the one of the randomly selected base stations having a higher average duration of activity time than one of existing target base stations and executing the steps of recording and determining for the one of the randomly selected base stations.

5. The method of claim 2 wherein the activity transfers are handoffs.

6. The method of claim 2 wherein the activity transfers are registrations.

7. A method of learning of target base stations to which activity transfers of wireless handsets can be made from a current base station in a wireless switching system, comprising the steps of:

performing activity transfers from the current base station to each of the target base stations;

measuring performance of each of the target base stations in maintaining the activities of the wireless handsets and the step of measuring comprises the step of calculating the average maximum amount of transmission power received from each of the target base stations after each of the activity transfers from the current base station to each of the target base stations;

recording the measured performance of each of the target base stations; and determining subsequently one of the target base stations to which to do a activity transfer based on the recorded measured performance of the target base stations.

8. The method of claim 7 wherein the step of determining comprises the step of selecting the one of target base stations having the highest average maximum amount of transmission power.

9. The method of claim 8 wherein the activity transfers are handoffs.

10. The method of claim 8 wherein the activity transfers are registrations.

11. A method of learning of target base stations to which activity transfers of wireless handsets can be made from a current base station in a wireless switching system, comprising the steps of:

performing activity transfers from the current base station to each of the target base stations;

measuring performance of each of the target base stations in maintaining the activities of the wireless handsets and the step of measuring comprises the steps of detecting an occurrence of low transmission power for less than a predefined amount of time being received from the current base station after each of the activity transfers from the current base station, and calculating an average number of detected occurrences for each of the target base stations;

recording the measured performance of each of the target base stations; and determining subsequently one of the target base stations to which to do a activity transfer based on the recorded measured performance of the target base stations.

12. The method of claim 11 wherein the step of determining comprises the step of inhibiting a subsequent activity transfer to one of the target base stations upon the average number of occurrences being above a predefined maximum for the current base station.

13. The method of claim 12 wherein the activity transfers are handoffs.

14. The method of claim 12 wherein the activity transfers are registrations.

15. An apparatus for learning of target base stations to which activity transfers of wireless handsets can be made from a current base station in a wireless switching system, comprising:

means for performing activity transfers from the current base station to each of the target base stations;

means for measuring performance of each of the target base stations in maintaining the activities of the wireless handsets and the means for measuring comprises means for calculating an average duration of activity time of the wireless handsets in each of the target base stations after each of the activity transfers from the current base station;

means for recording the measured performance of each of the target base stations; and means for determining subsequently one of the target base stations to which to do a activity transfer based on the recorded measured performance of the target base stations.

16. The apparatus of claim 15 wherein the means for determining comprises means for selecting the one of target base station having the longest average duration of activity time.

17. The apparatus of claim 16 wherein the means for calculating comprises means for including into the average duration of activity time an additional amount of time that activity of each of the wireless handsets is maintained by another base station after an activity transfer has occurred from each of the target base stations to the other base station.

18. The apparatus of claim 16 wherein the means for performing comprises means for doing activity transfers to randomly selected base stations other than the target base stations and executing the means for measuring for the randomly selected base stations; and means for designating one of the randomly selected base stations as a target base station upon the one of the randomly selected base stations having a higher average duration of activity time than one of existing target base stations and executing the means for recording and determining for the one of the randomly selected base stations.

19. The apparatus of claim 16 wherein the activity transfers are handoffs.

20. The apparatus of claim 16 wherein the activity transfers are registrations.

21. An apparatus for learning of target base stations to which activity transfers of wireless handsets can be made from a current base station in a wireless switching system, comprising:

means for performing activity transfers from the current base station to each of the target base stations;

means for measuring performance of each of the target base stations in maintaining the activities of the wireless handsets and the means for measuring comprises means for calculating the average maximum amount of transmission power received from each of the target base stations after each of the activity transfers from the current base station to each of the target base stations;

means for recording the measured performance of each of the target base stations; and means for determining subsequently one of the target base stations to which to do a activity transfer based on the recorded measured performance of the target base stations.

22. The apparatus of claim 21 wherein the means for determining comprises means for selecting the one of target base stations having the highest average maximum amount of transmission power.

23. The apparatus of claim 22 wherein the activity transfers are handoffs.

24. The apparatus of claim 22 wherein the activity transfers are registrations.

25. An apparatus for learning of target base stations to which activity transfers of wireless handsets can be made from a current base station in a wireless switching system, comprising:

means for performing activity transfers from the current base station to each of the target base stations;

means for measuring performance of each of the target base stations in maintaining the activities of the wireless handsets and the means for measuring comprises means for detecting an occurrence of low transmission power for less than a predefined amount of time being received from the current base station after each of the activity transfers from the current base station, and means for calculating an average number of detected occurrences for each of the target base stations;

means for recording the measured performance of each of the target base stations; and means for determining subsequently one of the target base stations to which to do a activity transfer based on the recorded measured performance of the target base stations.

26. The apparatus of claim 25 wherein the means for determining comprises means for inhibiting a subsequent activity transfer to one of the target base stations upon the average number of occurrences being above a predefined maximum for the current base station.

27. The apparatus of claim 26 wherein the activity transfers are handoffs.

28. The apparatus of claim 26 wherein the activity transfers are registrations.

* * * * *